C. G. OCHILTREE.
LAMP CORD ADJUSTER.
APPLICATION FILED NOV. 3, 1910. RENEWED DEC. 4, 1911.
1,015,828.
Patented Jan. 30, 1912.
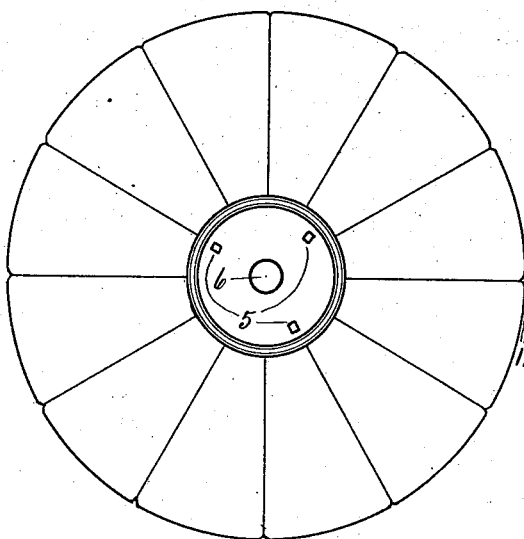
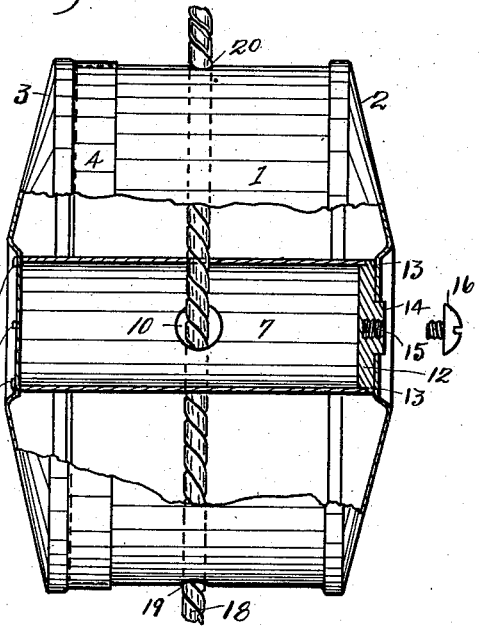
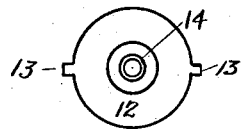
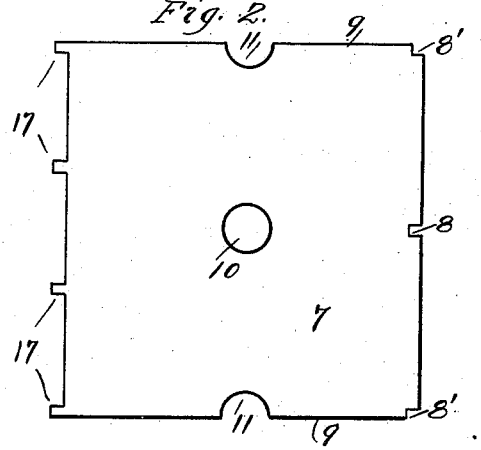

UNITED STATES PATENT OFFICE.

CLARENCE G. OCHILTREE, OF SEATTLE, WASHINGTON.

LAMP-CORD ADJUSTER.

1,015,828. Specification of Letters Patent. Patented Jan. 30, 1912.

Application filed November 3, 1910, Serial No. 590,551. Renewed December 4, 1911. Serial No. 663,839.

*To all whom it may concern:*

Be it known that I, CLARENCE G. OCHILTREE, a citizen of the United States, and a resident of Seattle, in the county of King and State of Washington, have invented certain new and useful Improvements in Lamp-Cord Adjusters, of which the following is a full, true, and exact specification.

The principal object of my invention is to provide a neat, compact device of this character, of substantially smooth exterior, from which no levers, push buttons or the like project, quickly attachable to an ordinary lamp cord, and by the manipulation of which a lamp attached to the cord may be conveniently raised or lowered and held at various heights.

Referring to the accompanying drawings, Figure 1 is an edgewise view of my device, the shell being broken away, showing the drum in central longitudinal section. Fig. 2 is a development of the drum as it is "blanked" out. Fig. 3, a plan view of the washer. Fig. 4, an end elevation of the device.

The casing is formed of the hollow cylinder 1, one end of which is permanently closed by the cap 2 which is spun over or otherwise secured to the circular edge of the cylinder 1. A similar cap 3, is secured to the band 4, which band fits over the outer circular edge of the opposite end of the cylinder 1 and forms a loosely fitting cover. The caps 2 and 3 may be identical with each other and blanked and formed by the same dies, although the openings 5 in the cap 2 are not used, and the circular opening 6 in the cap 3 is not used, as will presently appear.

7 is the drum having the notch 8 upon one side of its circular edge, and a similar notch directly opposite, formed by the meeting of the two recesses 8' when the edges 9 are brought together to form the drum, as will be readily understood.

10 is an opening through one wall of the drum, an opposite opening being formed by the meeting of the two semicircular recesses 11, when the drum is formed.

12 is the washer for the end of the drum 7, which washer has the projections 13 and the shoulder 14, through which shoulder is the opening 15, threaded to fit the screw 16, the head of which is of slightly greater diameter than the opening 6 in the cap 2.

The drum 7 is secured to the cap 3 by inserting the projections 17, upon one end of the drum, into the openings 5 in the cap, and upsetting or turning over the edges of the projections 17. The washer 12 is then inserted through the opposite end of the drum 7, the projections 13 fitting into the openings 8 and the opposite opening formed by the meeting of the recesses 8'. The shoulder 14 is now thrust through the opening 6 in the cap 2 and the screw 16 screwed down firmly upon the end of the shoulder 14, the head of the screw 16 holding the cap 2 against any considerable longitudinal displacement with relation to the washer 12, but allowing the cap 2 to revolve with relation to the washer 12. The lamp cord 18 is then passed through the opening 19 in the side of the shell 1, thence through the opening 10 and its opposite opening formed by the recesses 11, and finally out through the opening 20 in the opposite side of the shell 1.

It will be understood that the material from which the drum 7 is formed is relatively heavy and stiff, such, for instance, as cold rolled steel, and of a gage sufficiently heavy to insure the stability of the right hand end of the drum 7, despite the stress of the cord 18, the left hand end of the drum 7 being firmly held together by the projections 17 upset or clenched over the cap 3. It will of course be understood that the drum 7 may be cast instead of stamped, in which case the projections 17 openings 8, 10, and 11, may be machined.

It will be observed that I extend the shoulder 14 a considerable distance beyond the outer surface of the cap 2 immediately surrounding the shoulder so that, in the operation of the device, when the cap 2 is turned toward the left the same may be, at the same time, lightly pressed against the outer face of the washer 12, which prevents any possibility of loosening the screw 16.

From the foregoing it will be seen that an electric light bulb, for example, attached to the lower end of the cord 18, may be quickly and conveniently adjusted to any desired height by holding the cap 2 firmly in one hand and turning the cap 3, which causes the cord 18 to wrap around the drum 7 and raise the lamp bulb, the friction of the cord in the drum being sufficient to hold the lamp in its adjusted position.

While I have shown and described a particular form of embodiment of my invention, I am fully aware that many minor changes in details of construction and arrangement will readily suggest themselves to others skilled in the art, without departing from the spirit and scope of my invention, and I do not, therefore, desire to be limited to the exact form of construction herein shown and described.

Having described my invention, what I claim as new is,—

A lamp cord adjuster comprising a cylindrical shell having one of its ends permanently closed, a loose cover upon the opposite end of said shell, openings through said cover, a drum of relatively stiff material, means for securing said drum to said cover, said means including projections from said drum and integral therewith adapted to register with the said openings in said cover and upset or clenched thereto, a washer, projections from said washer, recesses in the circular edge of said drum to receive said last named projections, a shoulder upon said washer, an opening through said closed end of said shell to receive said shoulder, a threaded opening through said shoulder to receive a screw having a head of greater diameter than that of said last named opening, and openings through the sides of said shell and said drum to receive a lamp cord.

CLARENCE G. OCHILTREE.

Witnesses:
FRED P. GOVIN,
H. RUPERT.

---

Copies of this patent may be obtained for five cents each, by addressing the "Commissioner of Patents, Washington, D. C."